United States Patent

[11] 3,603,467

| [72] | Inventor | James H. Siler |
|---|---|---|
| | | Star Rte. A, Box 259, Hobbs, N. Mex. 88240 |
| [21] | Appl. No. | 815,068 |
| [22] | Filed | Apr. 10, 1969 |
| [45] | Patented | Sept. 7, 1971 |

[54] POWER TRUCKLE FOR TRAILER HOUSE
8 Claims, 7 Drawing Figs.

[52] U.S. Cl. .................................................... 214/334
[51] Int. Cl. ..................................................... B60b 29/00
[50] Field of Search ........................................ 214/334, 330, 16.18 A, 16.14 E; 180/1 AW

[56] References Cited
UNITED STATES PATENTS

| 1,574,822 | 3/1926 | Koch | 214/16.18 A |
| 2,598,750 | 6/1952 | Bargehr | 214/16.14 E |
| 2,980,270 | 4/1961 | Elliott et al. | 214/334 X |
| 1,456,457 | 5/1923 | Molniar | 180/1 AW |
| 3,361,277 | 1/1968 | Johnson et al. | 214/334 |

*Primary Examiner*—Albert J. Makay
*Attorney*—Pravel, Wilson & Matthews

ABSTRACT: A power truckle adapted to receive a trailer house thereon, and which trailer house is thereafter moved laterally on the truckle to an otherwise inaccessible place for the storage or parking of the trailer house.

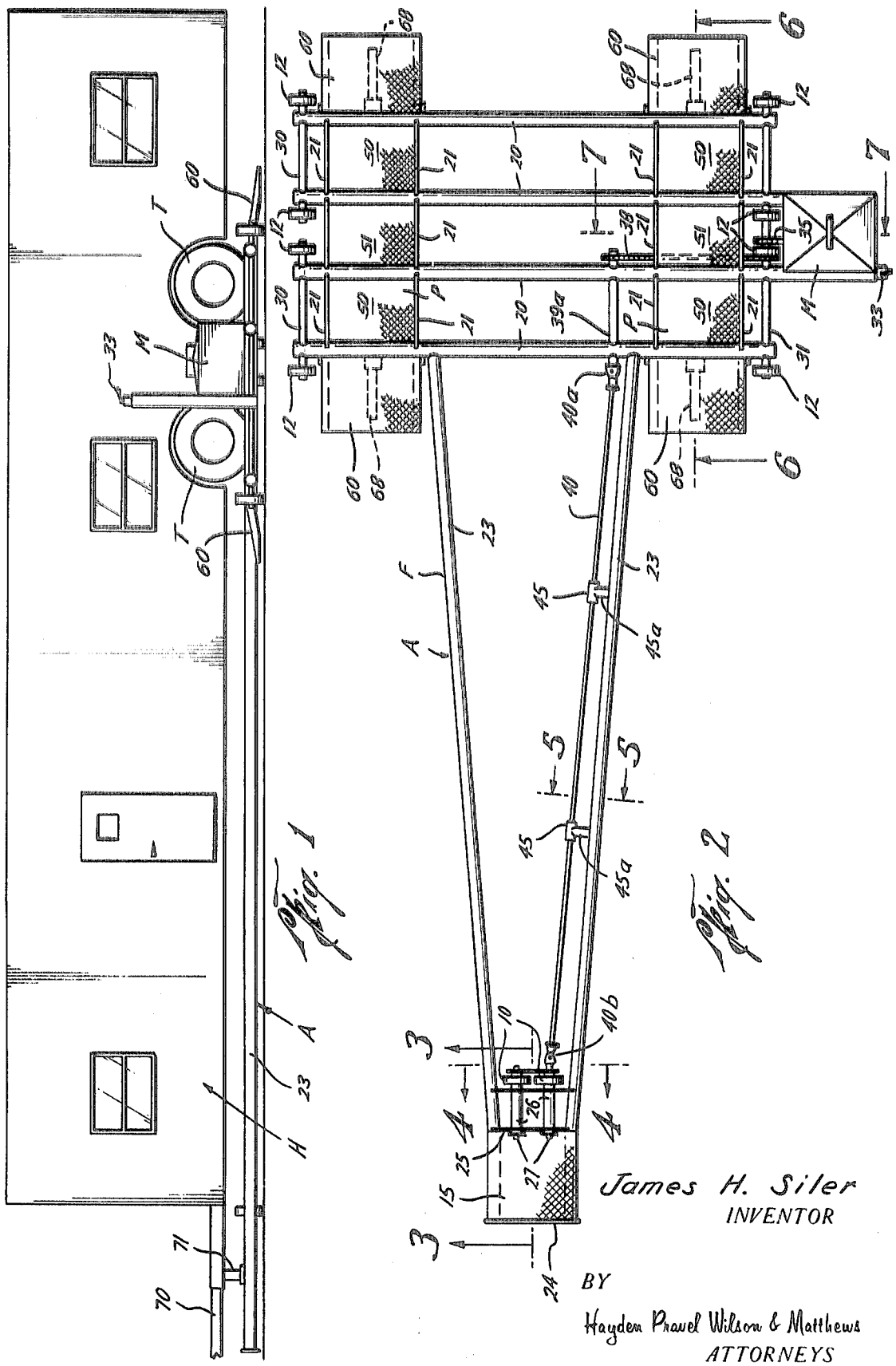

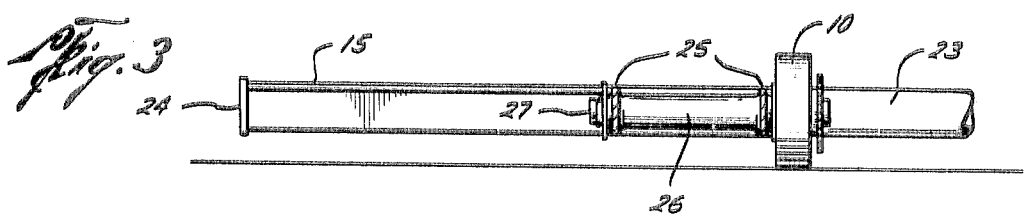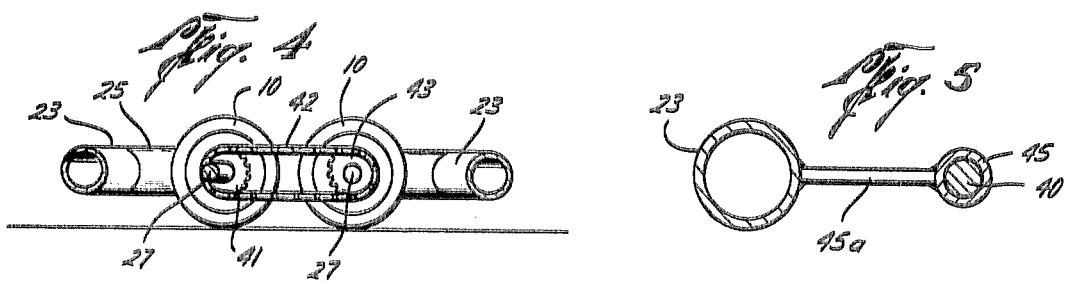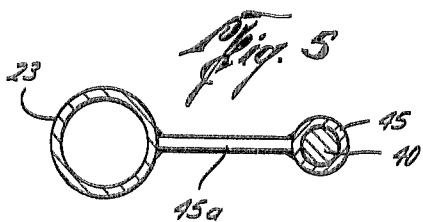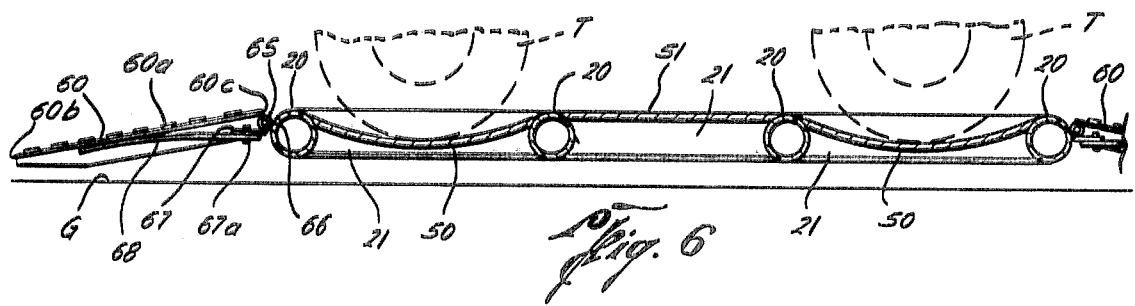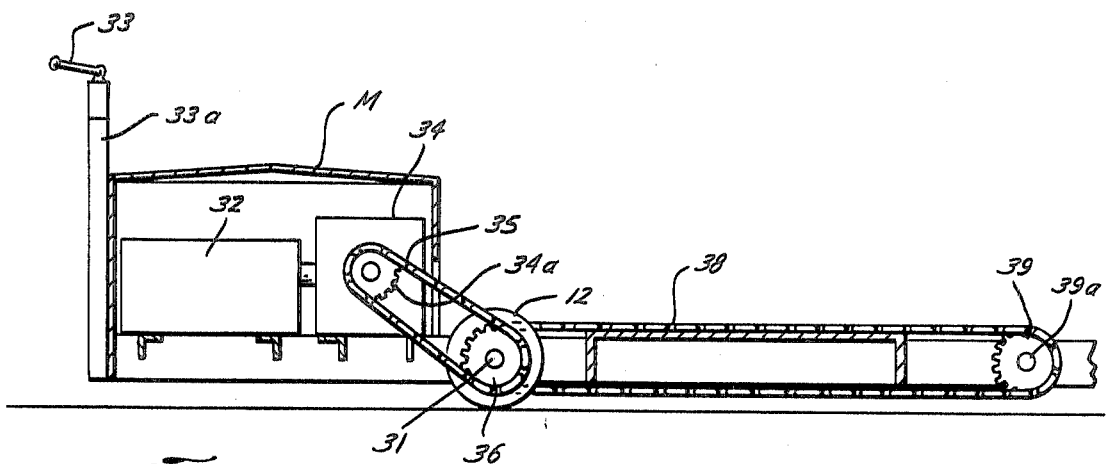

3,603,467

POWER TRUCKLE FOR TRAILER HOUSE

BACKGROUND OF THE INVENTION

The field of the invention is devices for supporting and moving house trailers.

The parking of house trailers is difficult even under ideal conditions because of the size and lack of maneuverability of the trailer. The house trailer has heretofore been moved by a pulling vehicle so that the places to which such house trailers can be moved has been necessarily limited to areas which permitted a forward pulling or rearward backing of the vehicle and the house trailer together. In areas which have been inaccessible except by angling the house trailer, a great amount of space in both the longitudinal and lateral directions was required. Therefore this meant that many areas, such as small backyards, were virtually inaccessible and unavailable for the parking or storage of the house trailers, even though such areas were large enough in dimensions to accommodate the house trailer by itself.

SUMMARY OF THE INVENTION

The present invention relates to a power truckle for receiving and moving a house trailer so that the house trailer can be parked or stored in an otherwise inaccessible area for such parking or storage. With the present invention, a house trailer may be pulled forwardly or backed rearwardly with an automobile, truck or other vehicle to position the house trailer on the truckle. Then, after the vehicle is detached from the house trailer, the truckle can be moved laterally or sideways to an area which may be just slightly larger than the house trailer itself.

BRIEF DESCRIPTION OF THE DRAWINGS

FIG. 1 is an elevation of the power truckle of this invention, with a trailer house positioned thereon;

FIG. 2 is a plan view of the power truckle of this invention;

FIG. 3 is a sectional view taken on line 3—3 of FIG. 2 to illustrate details of the preferred form of the front wheel support for the power truckle;

FIG. 4 is a sectional view taken on line 4—4 of FIG. 2 to further illustrate the front wheel structure;

FIG. 5 is a sectional view taken on line 5—5 of FIG. 2;

FIG. 6 is a sectional view taken on line 6—6 of FIG. 2 and illustrates details of the preferred form of the tire platform and ramp means of the power truckle of this invention; and FIG. 7 is a sectional view taken on line 7—7 of FIG. 2 to illustrate one form of driving means for the power truckle of this invention.

DESCRIPTION OF THE PREFERRED EMBODIMENT

In the drawings, the letter A designates generally the power truckle of this invention which is adapted to receive a house trailer H thereon for lateral movements, as will be explained. Briefly, the power truckle A includes a support frame F which has one or more front wheels 10 at its forward end and at least two laterally spaced rear wheels 12 at the rear end of the frame F. A pair of laterally spaced tire support platforms P are connected to or mounted on said support frame in proximity to the rear wheels 12 for receiving the tires T (FIG. 1) of the house trailer H. A front support plate or means 15 is provided for receiving the front end of the house trailer, as will be more evident hereinafter. At least one of the wheels 10 and 12, and preferably a plurality of the wheels 10 and 12 are driven by a power means M so as to move the support frame and the parts therewith laterally with respect to the longitudinal axis of the support frame F. With the power truckle A of the present invention, a vehicle may pull the house trailer longitudinally into position on the power truckle A, then the vehicle may be detached or disconnected from the house trailer H, and thereafter, the power means M may be actuated to move the power truckle A and the house trailer H therewith laterally in either direction so as to position the house trailer H in an otherwise inaccessible location.

Considering the preferred embodiment of the present invention more in detail, the support frame F is constructed from a plurality of laterally extending rear pipes 20 which are united or are connected together by longitudinally extending plates 21 which are welded thereto, or any other suitable connecting means. The forwardmost rear pipe 20 is welded or otherwise secured to a pair of forwardly inclined pipes 23 which extend forwardly to the forward support plate 15 at the forward end of the support platform F. The inclined pipes 23 are welded together through the support plate 15 or any other suitable connecting means. A front connector plate 24 is also preferably welded between the ends of the inclined frame members or pipes 23 to further strengthen the connection therebetween.

A pair of brace plates 25 (FIGS. 2 and 3) extend between the forward ends of the inclined frame pipes 23 and are welded thereto for rigidifying the front end of the frame F and for also supporting a pair of axle housings 26. Each of the axle housings 26 passes through suitable openings in the brace plates 25 and is welded thereto so that the housings 26 are opened at both ends for receiving a stub axle 27, each of which has a wheel 10 rotatably mounted thereon. It is to be noted that the axles 27 extend longitudinally, i.e., parallel to the longitudinal axis of the support frame F, and the wheels 10 are mounted in tandem substantially perpendicular to the longitudinal axis of the support frame F for lateral or sideways movement thereof.

The rear wheels 12 may be suitably mounted on the support platform F in any suitable manner, but as shown in FIG. 2, a pair of axles 30 are mounted at the ends of the laterally extending pipes 20 while a single axle 31 is mounted at the other end of such pipes 20. The pair of axles 30 may of course be replaced by a single axle and likewise, the single axle 31 may be replaced by a pair of axles, or any other suitable axle support for supporting the wheels 12. It is to be noted that the axles 30 and 31 extend parallel to the longitudinal axis of the support frame F and parallel to the axles 27 for the wheels 10. Thus, the wheels 12 are also aligned substantially perpendicular to the longitudinal axis of the support frame F and parallel to the wheels 10 so that they move in the lateral direction with respect to the longitudinal axis of the support frame F.

The wheels 12 at one side of the support frame F (the lower wheels 12 in FIG. 2) are preferably driven by a power means such as an electric motor 32 which is connected to any suitable source of electrical power such as 110 volts at a conventional house outlet. The motor 32 is connected electrically to a control lever 33 which is mounted on a post 33a adjacent to the power means M. As will be more evident hereinafter, the control lever 33 may be controlled manually to change the direction of the motor 32 for thereby determining the lateral direction of movement of the wheels 10 and 12. The electric motor 32 is operably connected in any conventional manner to a gear box or speed reducer 34 which has a suitable sprocket 34a mounted therewith for connection to a chain 35. The chain 35 engages a sprocket 36 mounted on the axle 31 so as to drive the axle 31 and thereby to drive the wheels 12 mounted on such axle 31. A second sprocket (not shown) on the shaft or axle 31 has a chain 38 operably disposed thereon, and such chain 38 extends to another sprocket 39 which is mounted on a rotatable shaft 39a supported in suitable openings of bearings in the two forwardmost support pipes 20 (FIG. 2). A drive shaft 40 connected by a universal joint 40a to the driven shaft 39a, and by another universal joint 40b to one of the stub shafts 27 serves to connect the power from the chain 38 to the shaft 27 and a sprocket 41 mounted thereon. The sprocket 41 has a chain 42 operably disposed thereon which is in engagement with a sprocket 43 on the other stub shaft 27, so that both of the wheels 10 are thereby driven (FIG. 4). The drive shaft 40 is supported at intervals by tubular guides 45 (FIGS. 2 and 5) which are connected to one of the inclined frame pipes 23 by guide support plates 45a which are welded between the pipe 23 and the guide 45.

Each of the tire support platforms P is preferably formed in three sections, with two of the sections 50 being curved downwardly to form a small pocket for receiving the tires T of the house trailer H therein (FIGS. 1 and 6). An intermediate plate 51 is substantially flat and provides a connecting surface between the tire receiving plates 50. Such plates 50 and 51 in each of the tire support platforms P preferably are welded to the pipes 20 and extend between and are welded to the longitudinal connecting plates 21.

A resiliently mounted ramp 60 is mounted at the forward and rear ends of each of the tire support platforms P. Each of such ramps 60 is formed with an inclined ramp or thread plate 60a having a lower end 60b and an upper end 60c (FIG. 6). A tubular pivot pin bracket 65 is welded or is otherwise secured to the forwardmost pipe 20 for the forward ramps 60 and the rearwardmost pipes 20 for the rear ramps 60. Each of such tubular pin brackets 65 receives a pivot pin 66 therethrough which is joined to the upper end 60c of the ramp member 60a so that the ramp member 60a is adapted to pivot about the pin 66. A spring bracket 67 is welded or is otherwise secured to the adjacent pipe 20 and it has a resilient flat spring 68 connected thereto by a bolt 67a or other suitable attaching means. The spring 68 for each of the ramps 60 engages the lower surface of the ramp plate 60a to hold the lower end 60b away from the ground G (FIG. 6) a sufficient distance to prevent contact between the ramp 60 and the ground during movement of the truckle A. However, the lower end 60b of each of the ramps 60 is sufficiently close to the ground G to enable a tire T to move thereon and force the end 60b into contact with the ground G to support the tire T as it moves up the ramp to position same on the tire support platform P. Also, such ramps 60 serve to facilitate the movement of the tires on the pulling vehicle for the house trailer H as the pulling vehicle moves from the rear ramps 60 upwardly over the tire support platforms P and then downwardly on the front ramps 60.

In the operation or use of the power truckle A of this invention, the truckle A is positioned on a driveway or roadway, opposite an inaccessible area on either side of the driveway or roadway where it is desired to park or store the trailer house H. With the trailer house H connected to a vehicle (not shown), such as an automobile, truck or the like through a conventional trailer hitch (not shown) on the front tongue 70 (FIG. 1) of the trailer house H, the trailer house H may be either pulled ahead to position the trailer house H on the truckle A, or the trailer house H may be backed into the truckle A. Normally, the automobile or truck is driven forwardly pulling the trailer house H forwardly and the truck or automobile tires engage the rear ramps 20 and pass over the tire support platforms B and then return to the ground level down the front ramps 60. The vehicle continues to move forwardly, pulling the trailer house H so that the tires T on the trailer house H ultimately move upon the rear ramps 60. When the two sets of tires T are in the tire wells 50, the forward pulling of the trailer house H is stopped. Thereafter, a conventional jack 71 or other support for the tongue 70 is lowered into position on the front platform 15 so as to support the front end of the trailer house H on the truckle A. The vehicle is then disconnected from the tongue 70 of the trailer house H. The motor 32 is then actuated through the control lever 33 to move the truckle A in either lateral direction with respect to the longitudinal axis of the support frame F. If the operator is assumed to be positioned at the control lever 33, he may either cause the truckle A to move away from him, or towards him, depending upon the direction of rotation of the motor 33. It will be appreciated that any reversing mechanism other than a reversible electric motor 32 may be employed. For example, a gear or transmission arrangement may be employed with a power source such as an electric motor which operates in only a single rotational direction, or any other power source. In any event, the truckle A may be moved laterally to thereby move the house trailer H laterally to an area which is slightly larger than the house trailer H itself. For example, the truckle A may be moved laterally into a backyard area on a relatively small city lot.

When it is desired to use the house trailer H again, the direction of lateral movement of the truckle A is reversed so as to move the house trailer H back into the alley or driveway or roadway, and then the pulling vehicle is reattached and the house trailer H may be pulled from the truckle A.

The truckle A is itself substantially free of maintenance requirements, and it may be easily transported from place to place on the top of a trailer or in a truck or other similar transporting device.

The foregoing disclosure and description of the invention are illustrative and explanatory thereof, and various changes in the size, shape, and materials as well as in the details of the illustrated construction may be made without departing from the spirit of the invention.

1. A power truckle for a house trailer, comprising:
 a. a longitudinally extending support frame having a forward end and a rearward end and comprising a plurality of laterally extending longitudinally spaced rear pipes having means connecting same together to form a unit, and a pair of longitudinally extending inclined pipes joined to the forwardmost rear pipe and extending forwardly to form said forward end;
 b. at least one laterally movable front wheel on said forward end;
 c. at least two laterally movable rear wheels on said rearward end which are spaced apart laterally;
 d. a pair of laterally spaced tire support platforms fixed on said support frame in proximity to said rear wheels for receiving the tires of a house trailer;
 e. front support means at said forward end of said support frame for supporting the front end of a house trailer; and
 f. power means separate from said platforms and operable by power other than the tires of the house trailer for driving at least one of said wheels for moving said support frame and the parts therewith laterally for thereby moving a house trailer thereon laterally.

2. The power truckle set forth in claim 1, including:
 a. inclined ramp means with each of said tire support platforms for facilitating the movement of the tires of the house trailer from ground level to the tire support platforms.

3. The power truckle set forth in claim 1, including:
 a. inclined ramp means with each of said tire support platforms for facilitating the movement of the tires of the house trailer from ground level to the tire support platforms; and
 b. resilient means for resiliently holding the lower edges of said ramp means off the ground so as to avoid contact with the ground upon lateral movement of the truckle but allowing for supporting contact with the ground when the tires move upwardly or downwardly on said ramp means.

4. The structure set forth in claim 1, including:
 a. means operably connecting said power means to all of said wheels for driving same simultaneously in either lateral direction.

5. The structure set forth in claim 1, including:
 a. a longitudinally extending axle for each of said wheels for mounting said wheels on said support frame for rolling movement in either lateral direction substantially perpendicular to the longitudinal axis of said support frame.

6. The structure set forth in claim 1, including:
 a. an additional front wheel in tandem with said one front wheel; and
 b. means mounting both of said front wheels for rolling movement substantially perpendicularly to the longitudinal axis of said support frame.

7. The structure set forth in claim 1, including:
 a. an axle extending longitudinally and disposed near the ends of at least one pair of said spaced rear pipes; and
 b. a pair of said rear wheels on each of said axles.

8. The power truckle set forth in claim 1, wherein said laterally spaced tire support platforms includes:
 at least one downwardly curved plate for each tire secured between an adjacent pair of said spaced rear pipes for forming a pocket for each tire of the trailer.